(12) United States Patent
Sang et al.

(10) Patent No.: US 12,256,352 B2
(45) Date of Patent: Mar. 18, 2025

(54) METHOD AND APPARATUS FOR OBTAINING TIMING ADVANCE VALUE

(71) Applicant: Telefonaktiebolaget LM Ericsson (PUBL), Stockholm (SE)

(72) Inventors: Dongsheng Sang, Beijing (CN); Ruiping Wei, Beijing (CN); Wenwen Liu, Beijing (CN); Yuan Wang, Beijing (CN); Wenling Bai, Beijing (CN)

(73) Assignee: Teleonaktiebolaget LM Ericsson (Publ), Stockholm (SE)

( * ) Notice: Subject to any disclaimer, the term of this patent is extended or adjusted under 35 U.S.C. 154(b) by 672 days.

(21) Appl. No.: 17/605,494

(22) PCT Filed: Apr. 24, 2019

(86) PCT No.: PCT/CN2019/084085
§ 371 (c)(1),
(2) Date: Oct. 21, 2021

(87) PCT Pub. No.: WO2020/215251
PCT Pub. Date: Oct. 29, 2020

(65) Prior Publication Data
US 2022/0182959 A1    Jun. 9, 2022

(51) Int. Cl.
*H04W 56/00* (2009.01)
*H04L 5/00* (2006.01)
(52) U.S. Cl.
CPC ....... *H04W 56/0045* (2013.01); *H04L 5/0048* (2013.01)
(58) Field of Classification Search
None
See application file for complete search history.

(56) References Cited

U.S. PATENT DOCUMENTS 9,509,542 B1    11/2016  Patel
2009/0068956 A1*  3/2009  Naito ............... H04B 17/336
                                                    455/67.11
(Continued)

FOREIGN PATENT DOCUMENTS

CN    104837160 A    8/2015
CN    106165481 A    11/2016
CN    109565708 A    4/2019

OTHER PUBLICATIONS

PCT Notification of Transmittal of the Internatinoal Search Report and the Written Opinion of the International Searching Authority, or the Declaration issued for International application No. PCT/CN2019/084085—Jan. 23, 2020.

(Continued)

*Primary Examiner* — Wutchung Chu
*Assistant Examiner* — Berhanu D Belete
(74) *Attorney, Agent, or Firm* — Weisberg I.P. Law, P.A.

(57) ABSTRACT

A method and an apparatus for obtaining timing advance value. The method comprises: receiving (S101) a time domain signal, which contains at least part of a reference signal; extracting (SI 02), from the time domain signal, a first group of signal parts including at least one signal part, and a second group of signal parts including at least one signal part, wherein the first group of signal parts do not overlap the second group of signal parts; and determining (S103) a timing advance, TA, value based on an energy of a signal part in the first group of signal parts and an energy of a signal part in the second group of signal parts, wherein the energy of the signal part is based on correlation between the signal part and the reference signal. Therefore, the TA value may be obtained based on a time domain signal.

13 Claims, 13 Drawing Sheets

(56) References Cited

U.S. PATENT DOCUMENTS

| | | | |
|---|---|---|---|
| 2013/0195084 A1* | 8/2013 | Chen | H04L 5/0048 370/336 |
| 2013/0279435 A1* | 10/2013 | Dinan | H04W 72/0446 370/329 |
| 2013/0288686 A1* | 10/2013 | Chou | H04L 27/2602 455/574 |
| 2015/0131590 A1* | 5/2015 | Dinan | H04W 56/005 370/329 |
| 2015/0146635 A1* | 5/2015 | Filipovich | H04W 74/0833 370/329 |
| 2016/0028533 A1* | 1/2016 | Kazmi | H04W 56/0045 370/296 |
| 2016/0088577 A1* | 3/2016 | Cui | H04W 52/54 370/336 |
| 2016/0366650 A1* | 12/2016 | Satou | H04W 52/54 |
| 2017/0188255 A1* | 6/2017 | Chandrasekhar | H04B 7/0632 |
| 2018/0014306 A1* | 1/2018 | Dinan | H04L 5/0094 |
| 2018/0020472 A1* | 1/2018 | Lin | H04W 56/00 |
| 2018/0070255 A1 | 3/2018 | Hong et al. | |
| 2018/0206262 A1* | 7/2018 | Cao | H04W 72/1268 |
| 2019/0274131 A1* | 9/2019 | Yamazaki | H04W 72/21 |
| 2019/0342052 A1* | 11/2019 | Hu | H04W 72/0453 |
| 2022/0279453 A1* | 9/2022 | Dinan | H04L 5/001 |

OTHER PUBLICATIONS

EPO Communication with Supplementary European Search Report dated Mar. 25, 2022 for Patent Application No. 19925581.1, consisting of 7-pages.

Zhen Li et al.; Sounding Reference Signal Based Timing Advance Adjustment for LTE-Satellite Mobile Communication Systems; 2016 19th International Symposium on Wireless Personal Multimedia Communications (WPMC); Nov. 14, 2016, consisting of 7-pages.

* cited by examiner

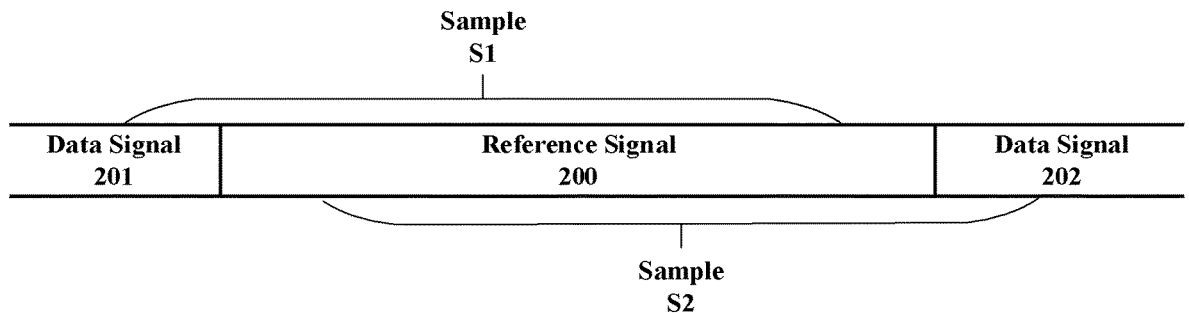
FIG. 3
FIG. 4
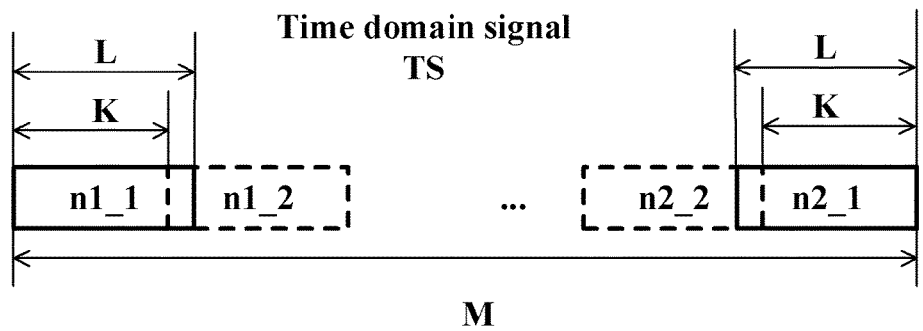
FIG. 5

(a)

(b)

METHOD AND APPARATUS FOR OBTAINING TIMING ADVANCE VALUE

PRIORITY

This nonprovisional application is a U.S. National Stage Filing under 35 U.S.C. § 371 of International Patent Application Serial No. PCT/CN2019/084085 filed Apr. 24, 2019 and entitled "Method and Apparatus for Obtaining Timing Advance Value", which is hereby incorporated by reference in its entirety.

TECHNICAL FIELD

The present disclosure relates generally to the technology of communication system, and in particular, to a method and an apparatus for obtaining a timing advance value.

BACKGROUND

This section introduces aspects that may facilitate better understanding of the present disclosure. Accordingly, the statements of this section are to be read in this light and are not to be understood as admissions about what is in the prior art or what is not in the prior art.

FIG. 1 is an exemplary diagram showing a simplified structure in a communication network for adjusting a timing advance. In the communication network, when a transmitter 101 uses a communication channel 102 to communicate with a receiver 103, it is usually important for the transmitter 101 to keep synchronization with the receiver 103.

In an example of the synchronization procedure, the receiver 103 estimates a timing advance, TA, value 104 based on received signal from the transmitter 101, and then sends the TA value 104 back to the transmitter 101. The transmitter 101 adjust timing points for sending other signals, based on the TA value 104.

In some application scenarios, such as a multi-tones/subcarriers transmission scenario, the receiver 103 may receive a signal including different tones/subcarriers with different frequencies during one transmission, i.e. at the same time. The TA value 104 may be estimated based on the phase difference of different tones/subcarriers transmitted at the same time.

However, in some other application scenarios, such as a single tone/subcarrier transmission scenario, the receiver 103 receives a signal including only one tone/subcarrier. It is hard to estimate the TA value 104.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Certain aspects of the present disclosure and their embodiments may provide solutions to these or other challenges. There are, proposed herein, various embodiments which address one or more of the issues disclosed herein. Namely, according to embodiments of the present disclosure, the TA value may be obtained based on a signal including only one reference signal.

A first aspect of the present disclosure provides a method performed at a network node, comprising: receiving a time domain signal, which contains at least part of a reference signal; extracting, from the time domain signal, a first group of signal parts including at least one signal part, and a second group of signal parts including at least one signal part, wherein the first group of signal parts do not overlap the second group of signal parts; and determining a timing advance, TA, value based on an energy of a signal part in the first group of signal parts and an energy of a signal part in the second group of signal parts, wherein the energy of the signal part is based on correlation between the signal part and the reference signal.

In embodiments of the present disclosure, the energy of the signal part is further based on an energy accumulation in a period time.

In embodiments of the present disclosure, a length of the time domain signal is equal to a length of the reference signal.

In embodiments of the present disclosure, determining the TA value based on an energy of a signal part in the first group of signal parts and an energy of a signal part in the second group of signal parts comprises: determining the TA value based on a comparison of an energy $E(n1)$ and an energy $E(n2)$; wherein the first group of signal parts are extracted from a start of the time domain signal, and the second group of signal parts are extracted from an end of the time domain signal; wherein the n1 refers to a signal part in the first group of signal parts; and wherein the n2 refers to a signal part in the second group of signal parts.

In embodiments of the present disclosure, determining the TA value based on a comparison of an energy $E(n1)$ and an energy $E(n2)$ comprises: if the comparison of an energy $E(n1\_1)$ and an energy $E(n2\_1)$ meets a first condition, determining the TA value is more than 0; if the comparison of the energy $E(n1\_1)$ and the energy $E(n2\_1)$ meets a second condition, determining the TA value is less than 0; if the comparison of the energy $E(n1\_1)$ and the energy $E(n2\_1)$ meets a third condition, determining the TA value is equal to 0; wherein the n1_1 refers to a signal part in the first group of signal parts, and at the start of the time domain signal; and wherein the n2_1 refers to a signal part in the second group of signal parts, and at the end of the time domain signal.

In embodiments of the present disclosure, determining the TA value based on a comparison of an energy $E(n1)$ and an energy $E(n2)$ further comprises: determining the TA value based on a period time between the start of the time domain signal and a first signal part in the first group of signal parts, if the TA value is more than 0, wherein at the first signal part, the energy $E(n1)$ meets a fourth condition; or determining the TA value based on a period time between the end of the time domain signal and a second signal part in the second group of signal parts, if the TA value is less than 0, wherein at the second signal part, the energy $E(n2)$ meets a fifth condition.

In embodiments of the present disclosure, the first condition comprises that an energy ratio of $E(n2\_1)/E(n1\_1)$ is more than a first threshold T1. The second condition comprises that the energy ratio of $E(n2\_1)/E(n1\_1)$ is less than a second threshold T2. The third condition comprises that the energy ratio of $E(n2\_1)/E(n1\_1)$ is more than the second threshold T2 and less than the first threshold T1. The first threshold T1 is more than 1, and the second threshold T2 is less than 1 and more than 0.

In embodiments of the present disclosure, the fourth condition comprises that, at the first signal part, along a first direction from the start to the end of the time domain signal, an energy ratio of $E(n2)/E(n1)$ changes from being more than a first threshold T1 to being not more than the first threshold T1; and the fifth condition comprises that, at the second signal part, along a second direction from the end to the start of the time domain signal, an energy ratio of E(n2)/E(n1) changes from being less than a second threshold T2 to being not less than the second threshold T2; wherein the first threshold T1 is more than 1, and the second threshold T2 is less than 1 and more than 0.

In embodiments of the present disclosure, the first condition comprises that an energy difference of E(n2_1)−E(n1_1) is more than a third threshold T3. The second condition comprises that the energy difference of E(n2_1)−E(n1_1) is less than a fourth threshold T4. The third condition comprises that the energy difference of E(n2_1)−E(n1_1) is more than the fourth threshold T4 and less than the third threshold T3. The third threshold T3 is more than 0, and the fourth threshold T4 is less than 0.

In embodiments of the present disclosure, the fourth condition comprises that, at the first signal part, along a first direction from the start to the end of the time domain signal, an energy difference of E(n2)−E(n1) changes from being more than a third threshold T3 to being not more than the third threshold T3; and the fifth condition comprises that, at the second signal part, along the second direction from the end to the start of the time domain signal, an energy difference of E(n2)−E(n1) changes from being less than a fourth threshold T4 to being not less than the fourth threshold T4. The third threshold T3 is more than 0, and the fourth threshold T4 is less than 0.

In embodiments of the present disclosure, a signal part is configured to be at least one of: overlapping with another signal part; adjacent to another signal part with a distance; and adjacent to another signal part without a distance and without overlapping.

A second aspect of the present disclosure provides a network node, comprising: a processor; and a memory, containing instructions executable by the processor. The network node is operative to: receive a time domain signal, which contains at least part of a reference signal; extract, from the time domain signal, a first group of signal parts including at least one signal part, and a second group of signal parts including at least one signal part, wherein the first group of signal parts do not overlap the second group of signal parts; and determine a timing advance, TA, value based on an energy of a signal part in the first group of signal parts and an energy of a signal part in the second group of signal parts, wherein the energy of the signal part is based on correlation between the signal part and the reference signal.

In embodiments of the present disclosure, the network node above mentioned is further operative to implement any method above mentioned.

A third aspect of the present disclosure provides a network node, comprising: a reception unit, configured to receive a time domain signal, which contains at least part of a reference signal; an extraction unit, configured to extract, from the time domain signal, a first group of signal parts including at least one signal part, and a second group of signal parts including at least one signal part, wherein the first group of signal parts do not overlap the second group of signal parts; a determination unit, configured to determine a timing advance, TA, value based on an energy of a signal part in the first group of signal parts and an energy of a signal part in the second group of signal parts, wherein the energy of the signal part is based on correlation between the signal part and the reference signal.

A fourth aspect of the present disclosure provides a computer readable storage medium having a computer program stored thereon, the computer program executable by a device to cause the device to carry out any method above mentioned.

A fifth aspect of the present disclosure provides a communication system comprising: a host computer including: processing circuitry configured to provide user data; and a communication interface configured to forward the user data to a cellular network for transmission to a terminal device; wherein the cellular network includes any network node above mentioned.

In embodiments of the present disclosure, the communication system above mentioned further comprises: the terminal device, configured to communicate with the network node.

In embodiments of the present disclosure, the processing circuitry of the host computer is configured to execute a host application, thereby providing the user data; and the terminal device includes a processing circuitry configured to execute a client application associated with the host application.

A sixth aspect of the present disclosure provides a communication system, comprising: a host computer including: a communication interface configured to receive user data originating from a transmission from a terminal device; and any network node above mentioned. The transmission is from the terminal device to the network node.

In embodiments of the present disclosure, the processing circuitry of the host computer is configured to execute a host application; and the terminal device is configured to execute a client application associated with the host application, thereby providing the user data to be received by the host computer.

BRIEF DESCRIPTION OF DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 3 is an exemplary diagram showing a received signal;

FIG. 4 is an exemplary diagram showing a substep of the method in FIG. 2;

FIG. 5 is an exemplary diagram showing the first group of signal parts and the second group of signal parts, according to embodiments of the present disclosure;

DETAILED DESCRIPTION

Figure 1:
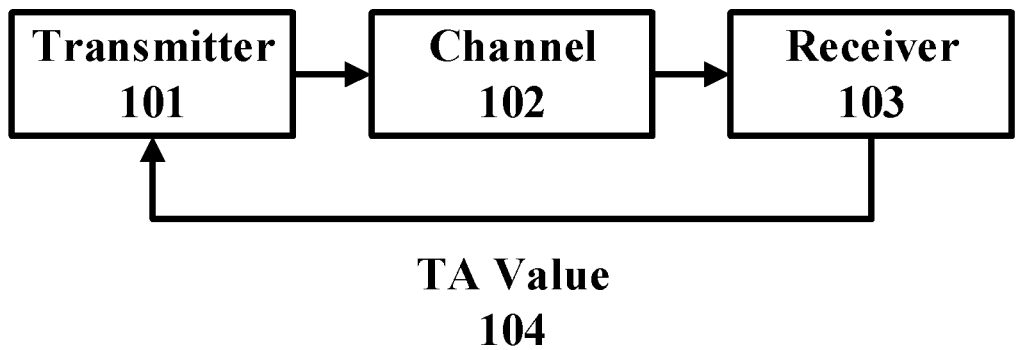
FIG. 1 is an exemplary diagram showing a simplified structure in a communication network for adjusting a timing advance value.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network", or "communication network/system" refers to a network/system following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "node", "network node" or "network side node" refers to a network device/apparatus/entity with accessing capability in a communication network via which a terminal device accesses to the network and receives services therefrom. The node/function may include a base station (BS), an access point (AP), a multi-cell/multicast coordination entity (MCE), a server node/function (such as a service capability server/application server, SCS/AS, group communication service application server, GCS AS, application function, AF), an exposure node (such as a service capability exposure function, SCE, network exposure function, NEF), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term terminal device encompasses a device which is able to communicate with a network node, such as a base station, or with another wireless device by transmitting and/or receiving wireless signals. Thus, the term terminal device encompasses, but is not limited to: a mobile phone, a stationary or mobile wireless device for machine-tomachine communication, an integrated or embedded wireless card, an externally plugged in wireless card, a vehicle, etc.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Figure 2:
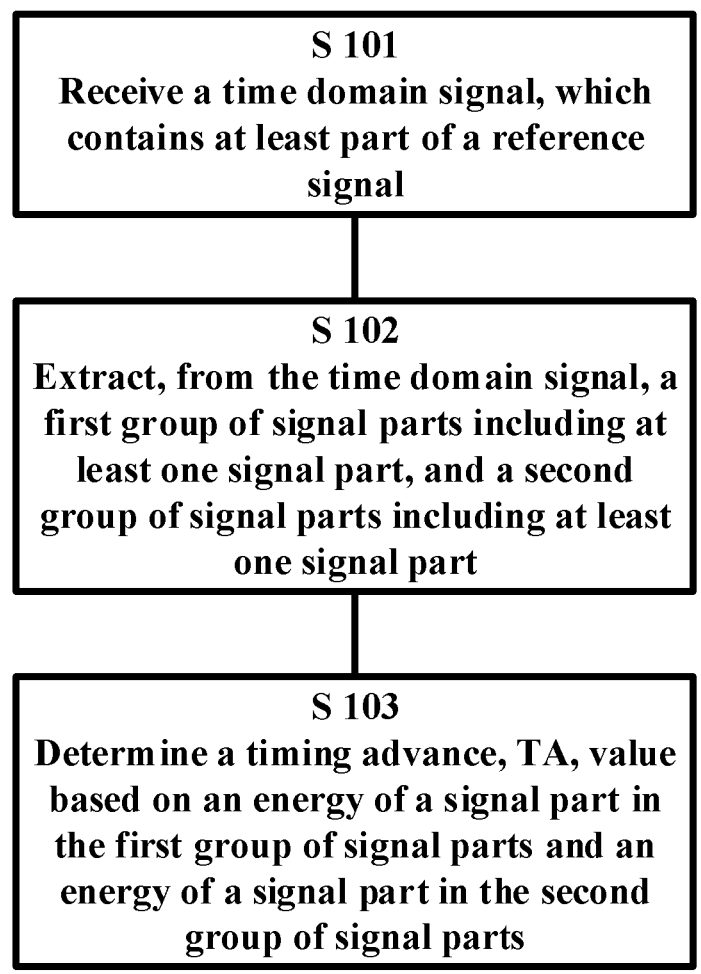
FIG. 2 is an exemplary flow chart showing a method for obtaining timing advance value, according to embodiments of the present disclosure.

FIG. 2 is an exemplary flow chart showing a method for obtaining timing advance value, according to embodiments of the present disclosure.

As shown in FIG. 2, a method performed at a network node comprises: S101, receiving a time domain signal, which contains at least part of a reference signal; S102, extracting, from the time domain signal, a first group of signal parts including at least one signal part, and a second group of signal parts including at least one signal part, wherein the first group of signal parts do not overlap the second group of signal parts; and S103, determining a timing advance, TA, value based on an energy of a signal part in the first group of signal parts and an energy of a signal part in the second group of signal parts. The energy of the signal part may be based on correlation between the signal part and the reference signal.

According to the embodiments of the present disclosure, the TA value may be obtained, based on a signal including only one reference signal. Specifically, the TA value may be obtained, based on energies of different signal parts of the received signal.

FIG. 3 is an exemplary diagram showing a received signal. As shown in FIG. 3, a reference signal 200 is included in the received signal, and usually, data signals, such as 201/202, are also included before and/or after the reference signal 200. It should be understood, the reference signal 200 may be any signal previously known by the receiver 103 before the transmission.

A specific sample, such as S1/S2, will be taken from the received signal by the receiver 103, as the time domain signal for estimating the TA value 104.

In embodiments of the present disclosure, a length of the time domain signal may be equal to a length of the reference signal. This is, in a situation of proper synchronization (not shown in FIG. 3), the sample will only include the reference signal 200. The TA value 104 may be determined as "0", which means the transmitter 101 needs not to adjust the timing point for transmitting other signals. It should be understood, the length of S1/S2 may be adjusted due to practical application circumstance. For example, the length of S1/S2 may be less than the length of the reference signal 200, so as to simplify the computation. In such case, when the actual absolute TA value is small but not zero, the shortened S1/S2 may still only include the part from the reference signal 200, and thus the TA value will be estimated as "0". However, such inaccuracy between the actual TA value and the estimated TA value is predictable, and thus can be controlled to be acceptable by adjusting the length of the time domain signal, namely S1/S2. One specific example for the length of S1/S2 less than the length of the reference signal 200 may be caused by signal processing. For example of another solution for simplifying the computation, the sample S1/S2 is not directly taken from the received time domain signal. Rather, the received time domain is processed firstly with a FFT, to obtain a frequency domain signal. Then, a part of frequency domain signal which includes the considered tone and some adjacent tones is extracted, and then processed with an IFFT, so as to obtain the time domain sample S1/S2. During such extraction and IFFT procedures, the length of obtained S1/S2 may be less than the length of the reference signal 200.

Further, when the reference signal 200 arrives later than planned, a sample S1 may be taken by the receiver 103. Accordingly, the receiver 103 may determine a TA value 104 more than "0", to indicate the transmitter 101 to transmit other signals before a planned timing, namely ahead of schedule.

When the reference signal 200 arrives previously than planned, a sample S2 may be taken by the receiver 103. Accordingly, the receiver 103 may determine a TA value 104 less than "0", to indicate the transmitter 101 to transmit other signals after a planned timing, namely postponed.

FIG. 4 is an exemplary diagram showing a substep of the method in FIG. 2.

In embodiments of the present disclosure, determining the TA value based on an energy of a signal part in the first group of signal parts and an energy of a signal part in the second group of signal parts comprises: determining the TA value based on a comparison of an energy $E(n1)$ and an energy $E(n2)$, wherein the first group of signal parts are extracted from a start of the time domain signal, and the second group of signal parts are extracted from an end of the time domain signal; wherein the n1 refers to a signal part in the first group of signal parts; and wherein the n2 refers to a signal part in the second group of signal parts.

According to embodiments of the present disclosure, the TA value may be obtained, based on energies of different signal part in different group of signal parts.

FIG. 5 is an exemplary diagram showing the first group of signal parts and the second group of signal parts, according to embodiments of the present disclosure.

As shown in FIG. 5, the time domain signal TS has a length of M (namely, the total number of all sample points), which is a positive integer. The first group of signal parts may include signal parts n1_1, n1_2 . . . , which are extracted along a first direction from the start to the end of the time domain signal TS. The second group parts may include signal parts n2_1, n2_2 . . . , which are extracted along a second direction from the end to the start of the time domain signal TS.

In FIG. 5, the adjacent signal parts overlapping with another signal part partially. However, this is not a limitation. In embodiments of the present disclosure, a signal part is configured to be at least one of: overlapping with another signal part; adjacent to another signal part with a distance; and adjacent to another signal part without a distance and without overlapping.

The same length of the signal part L, and the same interval K between the adjacent signal parts may be further defined for the first group and the second group, L, K are positive integer number. When the number of signal parts of each of the first group and the second group are the same and indicated by N, the N may be a positive integer number belonging to [1, (M/2−L)/K+1]. When N is equal to (M/2−L)/K+1, it means that signal parts of one group are extracted on one half of the time domain signal TS, and each group of signal parts has a length of M/2. The obtained TA value is more accurate when N has a large value. Thus, N can be determined based on accuracy requirement.

L may be less than M/2, namely, one signal part will not be longer than one half of the time domain signal TS. In a preferred embodiment, L is M/4. Accordingly, K may belong to [1: (M/2−L)].

A signal value of each sample points in the time domain signal TS may be presented as TS(i), i=1, 2, 3 . . . M.

Accordingly, for the first group of signal parts, a signal value of each sample point may be presented as: X(p1, q)=TS ((p1−1)*K+q); p1 is a sequence order number of each signal part of the first group of signal parts, q is a sequence order number of each sample point in a signal part; p1 is a positive integer number less than N; q is a positive integer number less than L.

Further, for the second group of signal parts, a signal value of each sample point may be presented as: Y(p2, q)=TS ((M−L−(p2−1)*K)+q); p2 is a sequence order number of each signal part of the second group of signal parts, q is a sequence order number of each sample point in a signal part; p2 is a positive integer number less than N; q is a positive integer number less than L.

Figure 6A:
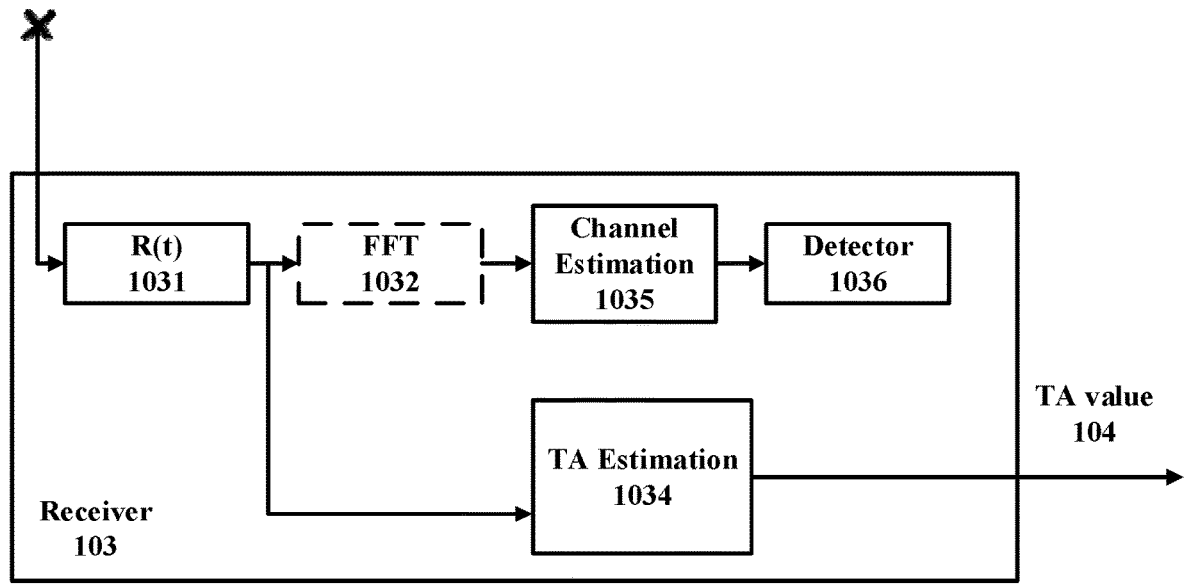
FIG. 6a is an exemplary block diagram showing signal flows in a receiver 103, to which the embodiments of the present disclosure may be implemented.
Figure 6B:
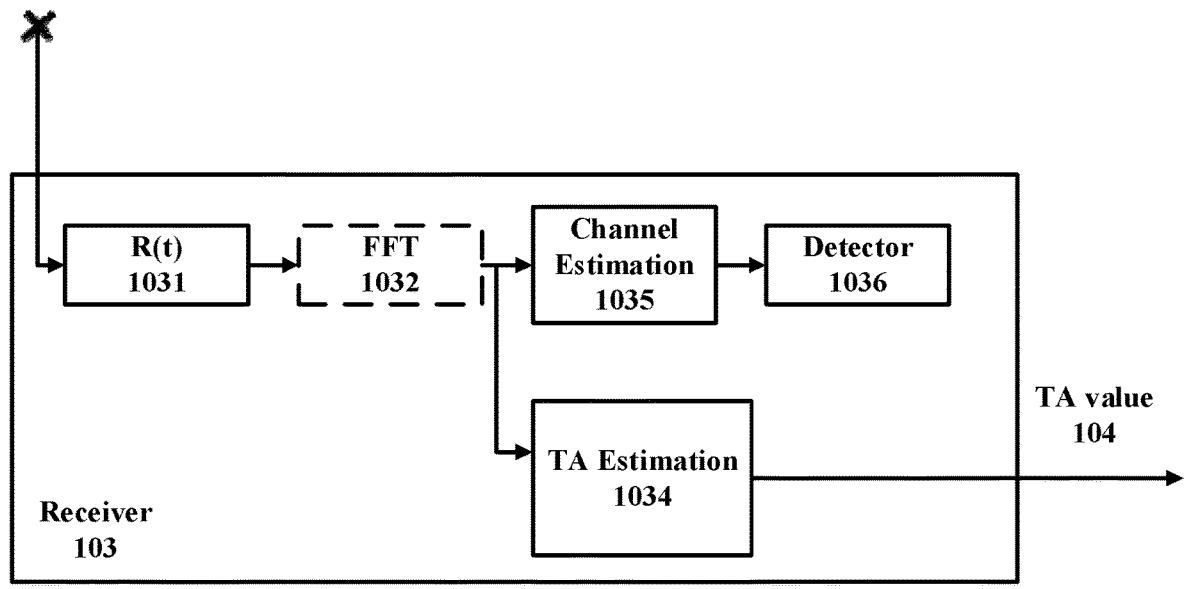
FIG. 6b is another exemplary block diagram showing signal flows in a receiver 103, to which the embodiments of the present disclosure may be implemented.

FIG. 6a is an exemplary block diagram showing signal flows in a receiver 103, to which the embodiments of the present disclosure may be implemented; FIG. 6b is another exemplary block diagram showing signal flows in a receiver 103, to which the embodiments of the present disclosure may be implemented.

As shown in FIG. 6a, the received signal may be represented as R(t) 1031. Then, in a signal transmission procedure, the R(t) 1031 will go through a Fast Fourier Transform, FFT, 1032, a channel estimation 1035 to a detector 1036. In parallel with this procedure, the R(t) 1031 may also go through the TA estimation 1034, such that the TA value 104 will be obtained. Further, in the signal transmission procedure, the R(t) 1031 before the FFT 1032 (namely, time domain) may be provided for the TA estimation 1034. The FFT 1032 may be optional, for example, may be only arranged in Orthogonal Frequency Division Multiplex, OFDM, systems.

As shown in FIG. 6b, in the signal transmission procedure, the R(t) 1031 after the FFT 1032 (namely, frequency domain) may be provided for the TA estimation 1034.

Figure 7:
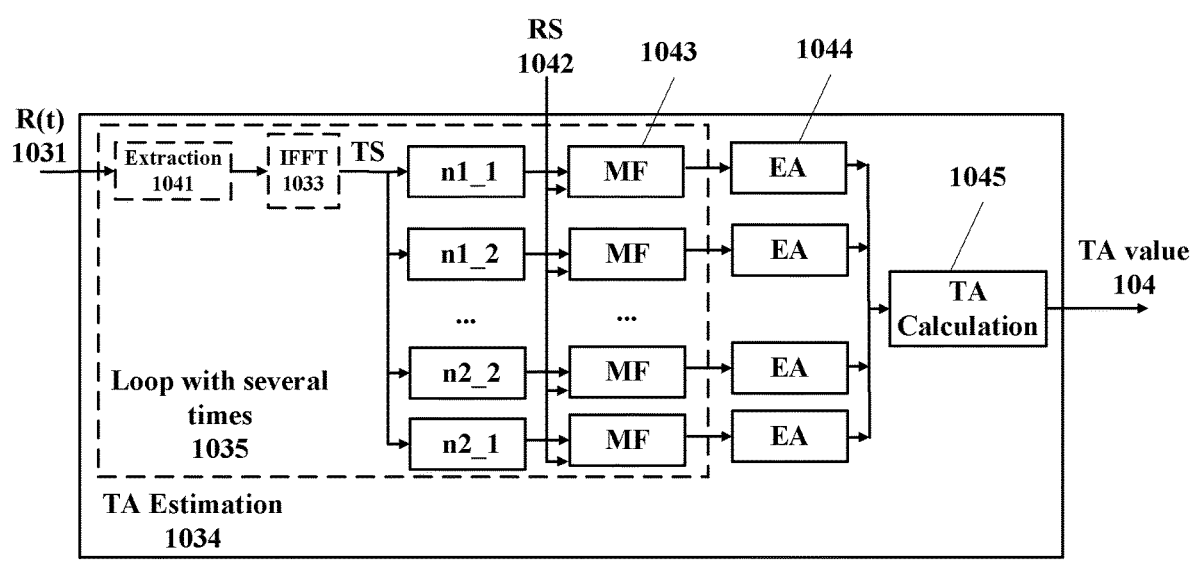
FIG. 7 is an exemplary block diagram showing the TA estimation 1034 according to embodiments of the present disclosure.

FIG. 7 is an exemplary block diagram showing the TA estimation 1034 according to embodiments of the present disclosure. As shown in FIG. 7, the R(t) 1031 goes through the extraction 1041 to provide the time domain signal TS, which is further divided to signal parts n1_1, n1_2, . . . , n2_2, n2_1.

Further, when the R(t) 1031 after FFT 1032 is received, an Inverse Fast Fourier Transform, IFFT, 1033 is further arranged. With FFT 1032 and IFFT 1033, the R(t) 1031 may be transformed to a frequency domain, and then transformed back to the time domain. It is advantageous because it will be possible to only select a part of frequency-domain signal including the tone/subcarrier carrying a reference signal, during the extraction 1041. The tone/subcarrier is used for the transmission between the transmitter 101 and the receiver 103.

Each signal parts will be input to a match filter MF 1043, so as to be correlated with the reference signal 1042 provided by the receiver 103. The reference signal 1042 is the same as the reference signal used by the transmitter 103. After the correlation in MF 1043, an energy for each signal part will be obtained.

The match filter 1043 is a linear filter that will correlate the received signal (signal parts) with the known reference signal RS 1042, and the MF 1043 will be done by the sum of each sample's multiplication between the received signal and the conjugated signal of known reference signal, and it will output a complex value.

The outputs of MF 1043 will be processed by removing the frequency offset and then be summed directly during a period time, so as to obtain one accumulation value in the period time.

Further, in embodiments of the present disclosure, the energy of the signal part is further based on an energy accumulation in a period time. For example, the procedure in the block 1035 may be looped with several times to obtain several energies for each signal parts, such that the energies of each signal part may be accumulated respectively in the energy accumulation 1044. The result of an accumulated energy for each signal part may be the sum of the several energies for each signal parts. Such accumulated energy may be further used in TA calculation 1045. For example, the energy of the signal part may be the square of the absolute value of the accumulation value of the outputs of the MF 1043 in the period time.

Figure 8:
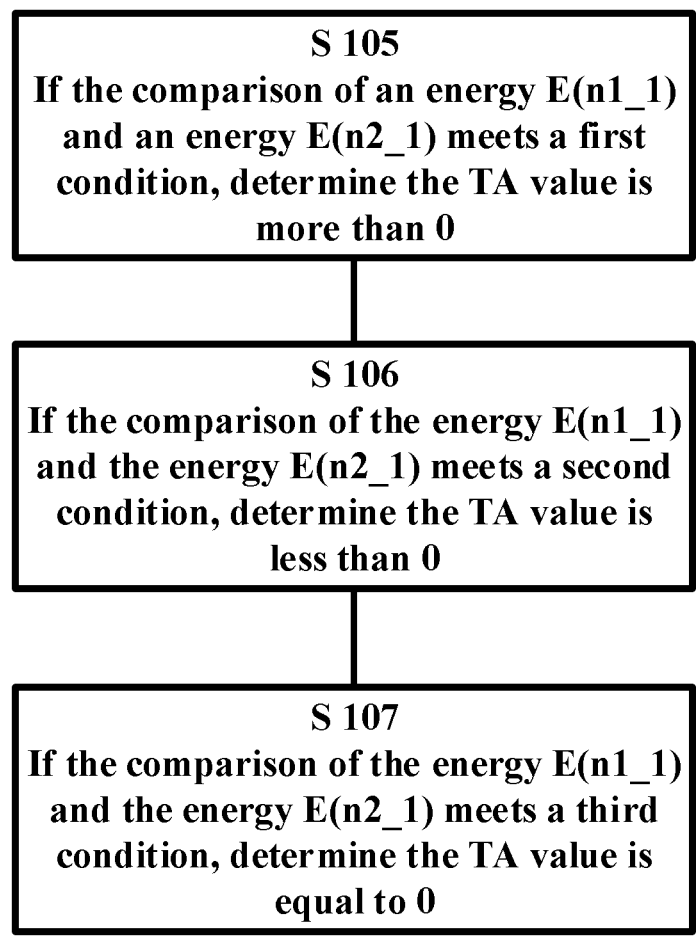
FIG. 8 is an exemplary flow chart showing substeps of the method in FIG. 4.

FIG. 8 is an exemplary flow chart showing substeps of the method in FIG. 4. As shown in FIG. 8, the step S104, determining the TA value based on a comparison of an energy E(n1) and an energy E(n2) comprises: S105, if the comparison of an energy E(n1_1) and an energy E(n2_1) meets a first condition, determining the TA value is more than 0; S106, if the comparison of the energy E(n1_1) and the energy E(n2_1) meets a second condition, determining the TA value is less than 0; S107, if the comparison of the energy E(n1_1) and the energy E(n2_1) meets a third condition, determining the TA value is equal to 0. The n1_1 refers to a signal part in the first group of signal parts, and at the start of the time domain signal; and the n2_1 refers to a signal part in the second group of signal parts, and at the end of the time domain signal.

According to the embodiments of the present disclosure, with the comparison of an energy E(n1_1), extracted from the start of the time domain signal, and an energy E(n2_1), extracted from the end of the time domain signal, a sign of the TA value is obtained quickly.

Figure 9:
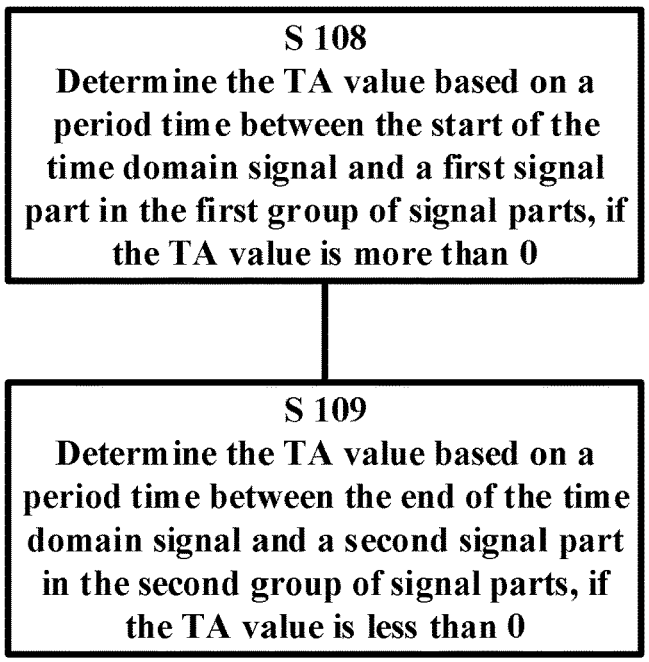
FIG. 9 is an exemplary flow chart showing other substeps of the method in FIG. 4.

FIG. 9 is an exemplary flow chart showing other substeps of the method in FIG. 4. As shown in FIG. 9, the step S104, determining the TA value based on a comparison of an energy E(n1) and an energy E(n2) further comprises: S108, determining the TA value based on a period time between the start of the time domain signal and a first signal part in the first group of signal parts, if the TA value is more than 0, wherein at the first signal part, the energy $E(n1)$ meets a fourth condition; or S109, determining the TA value based on a period time between the end of the time domain signal and a second signal part in the second group of signal parts, if the TA value is less than 0, wherein at the second signal part, the energy $E(n2)$ meets a fifth condition.

The above period times correspond to the absolute value of the TA value. According to embodiments of the present disclosure, not only the sign, but also an absolute value of the TA value will be obtained based on a comparison of an energy $E(n1)$ in the first group of signal parts and an energy $E(n2)$ in the second group of signal parts.

In embodiments of the present disclosure, any mathematic algorithm may be used for above conditions, so as to indicate the result of the comparison of the energy $E(n1)$ and the energy $E(n2)$. For example, a division operation may be used. The first condition comprises that an energy ratio of $E(n2\_1)/E(n1\_1)$ is more than a first threshold T1. The second condition comprises that the energy ratio of $E(n2\_1)/E(n1\_1)$ is less than a second threshold T2. The third condition comprises that the energy ratio of $E(n2\_1)/E(n1\_1)$ is more than the second threshold T2 and less than the first threshold T1. The first threshold T1 is more than 1, and the second threshold T2 is less than 1 and more than 0.

In embodiments of the present disclosure, the fourth condition comprises that, at the first signal part, along a first direction from the start to the end of the time domain signal, an energy ratio of $E(n2)/E(n1)$ changes from being more than a first threshold T1 to being not more than the first threshold T1; and the fifth condition comprises that, at the second signal part, along a second direction from the end to the start of the time domain signal, an energy ratio of $E(n2)/E(n1)$ changes from being less than a second threshold T2 to being not less than the second threshold T2; wherein the first threshold T1 is more than 1, and the second threshold T2 is less than 1 and more than 0.

Further, a subtraction operation may be used for above conditions, so as to indicate the result of the comparison of the energy $E(n1)$ and the energy $E(n2)$. In embodiments of the present disclosure, the first condition comprises that an energy difference of $E(n2\_1)-E(n1\_1)$ is more than a third threshold T3. The second condition comprises that the energy difference of $E(n2\_1)-E(n1\_1)$ is less than a fourth threshold T4. The third condition comprises that the energy difference of $E(n2\_1)-E(n1\_1)$ is more than the fourth threshold T4 and less than the third threshold T3. The third threshold T3 is more than 0, and the fourth threshold T4 is less than 0.

In embodiments of the present disclosure, the fourth condition comprises that, at the first signal part, along a first direction from the start to the end of the time domain signal, an energy difference of $E(n2)-E(n1)$ changes from being more than a third threshold T3 to being not more than the third threshold T3; and the fifth condition comprises that, at the second signal part, along the second direction from the end to the start of the time domain signal, an energy difference of $E(n2)-E(n1)$ changes from being less than a fourth threshold T4 to being not less than the fourth threshold T4. The third threshold T3 is more than 0, and the fourth threshold T4 is less than 0.

There is no further limitation on the thresholds T1~T4, as long as the signal part including content from a data signal and the signal part including content from the reference signal could be separated by the comparison.

As some exemplary values for T1~T4, the T1 may be 1.1, the T2 may be 0.9.

T3 and T4 may depend on the power level of $E(n2)$ or $E(n1)$. For example, the T3 may be $0.1*E(n1)$, and the T4 may be $-0.1*E(n1)$.

Figure 10:
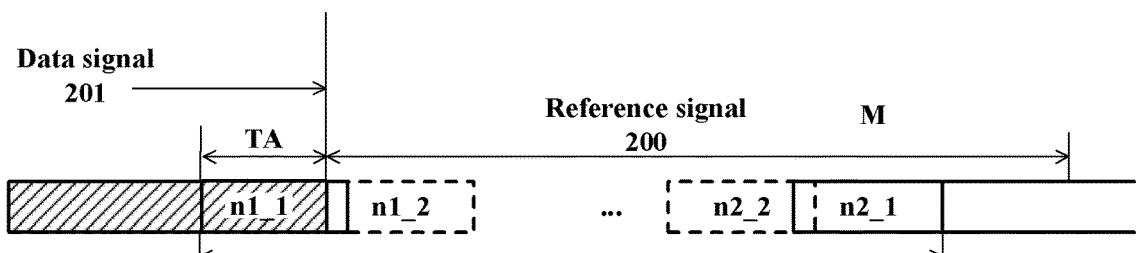
FIG. 10 is an exemplary diagram showing a principle to obtain the TA value, according to embodiments of the present disclosure.
Figure 10:
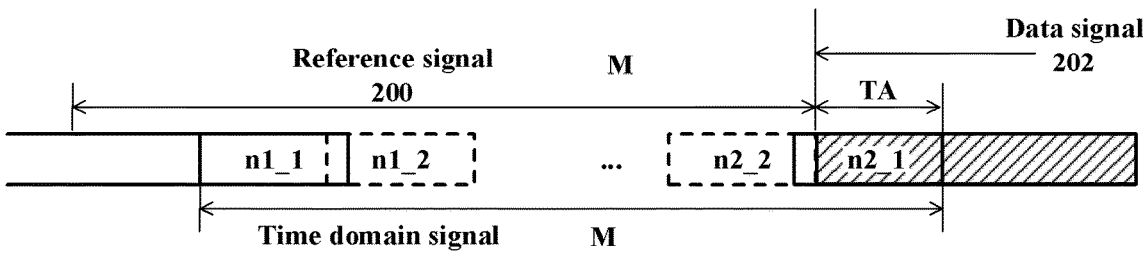

FIG. 10 is an exemplary diagram showing a principle to obtain the TA value, according to embodiments of the present disclosure.

In FIG. 10(a), it is shown that the reference signal 200 arrives later than planned, a sample S1 is taken by the receiver 103. As an example, the signal part n1_1 includes content from the data signal 201. Other signal parts, either in the first group or the second group, include content from the reference signal 200.

When an energy $E(n1)$ is compared with an energy $E(n2)$, the sign and the absolute value of the TA value will be obtained.

Firstly, the $E(n1\_1)$ and $E(n2\_1)$ will be compared, either by division operation or by subtraction operation. In FIG. 10(a), the $E(n1\_1)$ will have a relatively small value, since the signal part n1_1 has content from the data signal 201, and the data signal 201 has relatively low correlation with the reference signal RS 1042 in the receiver 103. The $E(n2\_1)$ will have a relatively big value, since the signal part n2_1 has content from the reference 200, and the reference 200 has relatively high correlation with the reference signal RS 1042 in the receiver 103. The reference signal 200 should be as same as the reference signal RS 1042 in the receiver 103, ignoring some noise or errors during transmission.

Therefore, the $E(n1\_1)$ and $E(n2\_1)$ will meets the first condition, namely, an energy ratio of $E(n2\_1)/E(n1\_1)$ is more than the first threshold T1 (bigger than 1), or an energy difference of $E(n2\_1)-E(n1\_1)$ is more than a third threshold T3 (bigger than 0).

Further, at the signal part n1_2, the energy $E(n1)$ meets a fourth condition. Namely, with a division operation as example, $E(n2)/E(n1\_1)$ is more than a first threshold T1, however, $E(n2)/E(n1\_2)$ is not more than the first threshold T1, since the signal part n1_2 and the signal part n2 all include contents from the reference signal 200, and thus $E(n2)$ and $E(n1\_2)$ may be similar.

According to FIG. 10(a), the sign of the TA value will be positive, and the absolute value of the TA value will be the period between the start of the time domain signal and the signal part n1_2.

The TA value will be computed with the following formula:

$$TA0*(F1-2) \le TA \le TA0*(F1-1);$$

$$TA0 = W*K/M;$$

wherein W may be the time length in seconds for one reference signal, F1 is the sequence number of the first signal part n1_F1.

The period time between the start of the time domain signal and the signal part n1_2, such as $TA0*(F1-2)$, or $TA0*(F1-1)$, may be taken as the specific TA value. Further, as an example to reduce error, a mid-value may be obtained as the specific TA value. Namely, $TA=TA0*(F1-2)+(TA0*(F1-1)-TA0*(F1-2))/2=TA0*(F1-2+\frac{1}{2})$.

For the example in the FIG. 10(a), the first signal part is the signal part n1_2, thus, F1 is 2. The TA value will satisfy $0 \le TA \le TA0$. The specific value may be TA=TA0, or TA=TA0/2, etc.

In FIG. 10(b), it is shown that the reference signal 200 arrives previously than planned, a sample S2 is taken by the receiver 103. As an example, the signal part n2_1 includes content from the data signal 202. Other signal parts, either in the first group or the second group, include content from the reference signal 200.

When an energy E(n1) is compared with an energy E(n2), the sign and the absolute value of the TA value will be obtained.

Firstly, the E(n1_1) and E(n2_1) will be compared, either by division operation or by subtraction operation. In FIG. 10(b), the E(n2_1) will have a relatively small value, since the signal part n2_1 has content from the data signal 202, and the data signal 202 has relatively low correlation with the reference signal RS 1042 in the receiver 103. The E(n1_1) will have a relatively big value, since the signal part n1_1 has content from the reference 200, and the reference 200 has relatively high correlation with the reference signal RS 1042 in the receiver 103. The reference signal 200 should be as same as the reference signal RS 1042 in the receiver 103, ignoring some noises or errors during transmission.

Therefore, the E(n1_1) and E(n2_1) will meets the second condition, namely, an energy ratio of E(n2_1)/E(n1_1) is less than the second threshold T2 (less than 1), or an energy difference of E(n2_1)−E(n1_1) is less than the fourth threshold T4 (less than 0).

Further, at the signal part n2_2, the energy E(n2) meets a fifth condition. Namely, with a division operation as example, E(n2_1)/E(n1) is less than a second threshold T2, however, E(n2_2)/E(n1) is not less than the second threshold T2, since E(n2_2) and E(n1) may be similar due to contents from the reference signal 200.

Based on FIG. 10(b), the sign of the TA value will be negative, and the absolute value of the TA value will be the period between the end of the time domain signal and the signal n2_2.

The TA value will be computed with the following formula:

$$-TA0*(F2-1) \leq TA \leq -TA0*(F2-2);$$

wherein F2 is the sequence number of the second signal part n2_F2.

Further, as an example, a mid-value may be obtained as the specific TA value. Namely, TA=−(TA0*(F2−2)+(TA0*(F2−1)−TA0*(F2−2))/2)=−TA0*(F2−2+½).

For the example in the FIG. 10(b), the second signal part is the signal part n2_2, thus, F2 is 2. The TA value will satisfy −TA0≤TA≤0. The specific value will be TA=−TA0, or TA=−TA0/2, etc.

Further, as a numeric example, W may have a value of 66.67 μs, which is a symbol time length. M has a value of 64. Namely, a time domain signal with a length of 66.67 μs and 64 sample points may be obtained.

Further, it may be L=K=16. Thus, N=2. Namely, a first group of signal parts has 2 signal parts, and a second group of signal parts has 2 signal parts. The signal parts are adjacent to each other without a distance/gap.

Therefore, the TA0=66.67*16/64≈46.66 μs.

Figure 11A:
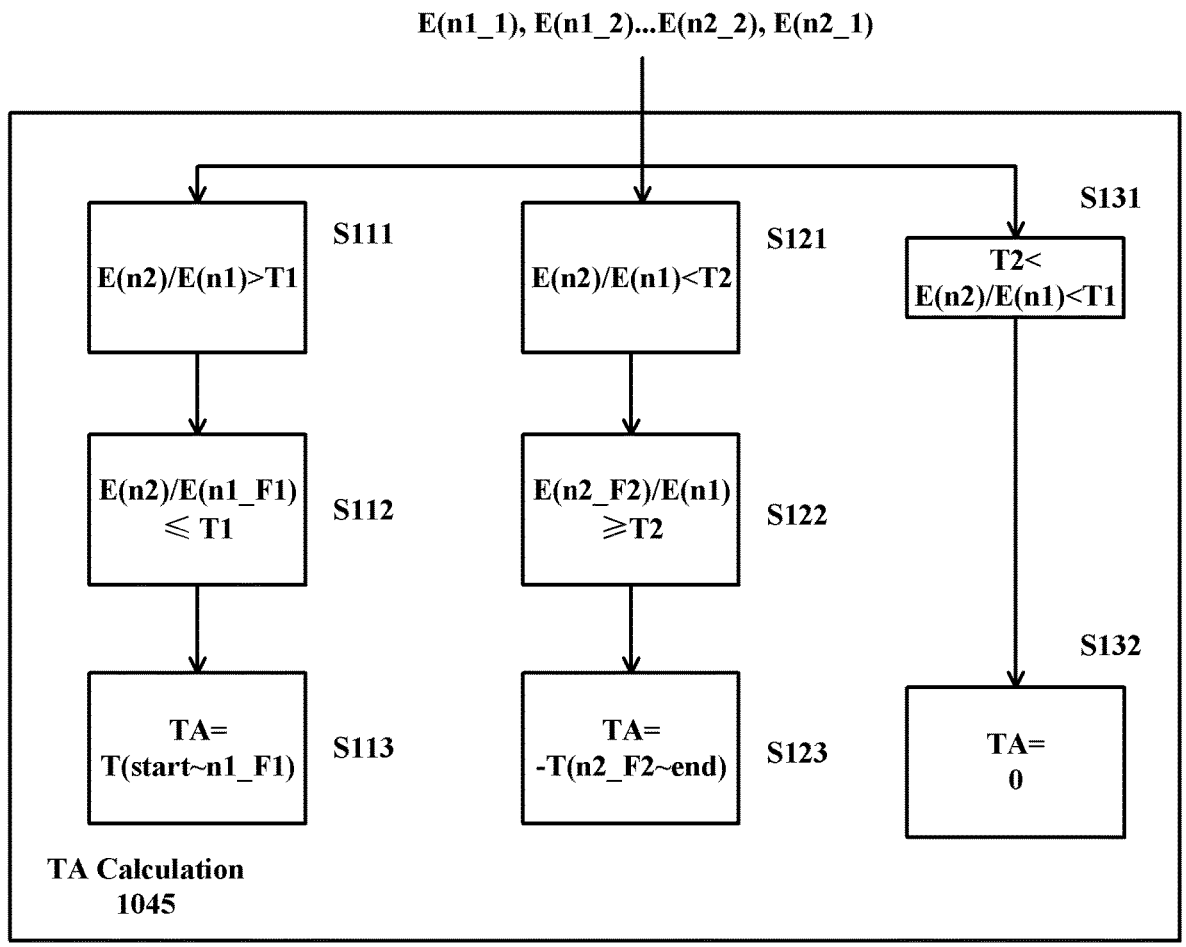
FIG. 11a is an exemplary diagram showing procedures in the TA calculation 1045.

FIG. 11a is an exemplary diagram showing procedures in the TA calculation 1045. As shown in FIG. 11, steps S111-S113 correspond to FIG. 10(a). The term n1_F1 corresponds to n1_2 in the FIG. 10(a), and T(start~n1_F1) corresponds to the period between the start of the time domain signal and the signal part n1_2.

Steps S121-S123 correspond to FIG. 10(b). The term n2_F2 corresponds to n2_2 in the FIGS. 10(b), and T(n2_F2~end) corresponds to the period between the signal part n2_2 and the end of the time domain signal.

Steps S131-S132 correspond to a situation not shown in FIG. 10. This is, the comparison of the energy E(n1) and the energy E(n2) meets a third condition, the TA value is determined to be equal to 0.

Figure 11B:
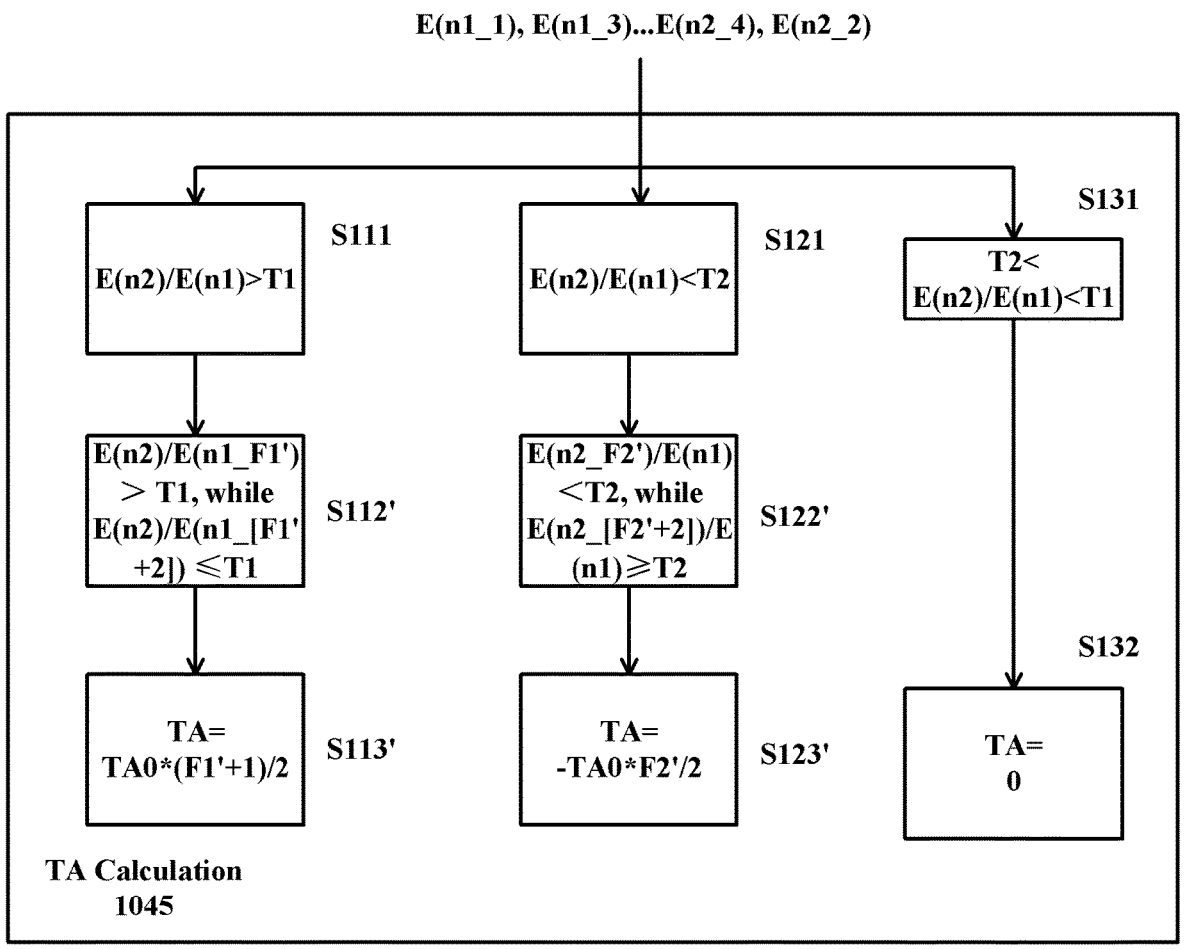
FIG. 11b is another exemplary diagram showing procedures in the TA calculation 1045.

FIG. 11b is another exemplary diagram showing procedures in the TA calculation 1045. In FIG. 11b, the principle is the same with that in FIG. 11a, and the procedures are similar with these in FIG. 11a.

As shown in FIG. 11b, firstly, the sequence numbers of the signal parts in the first group and the sequence numbers of the signal parts in the second group are different. For example, odd number 1, 3, 5 . . . are used for the first group of signal parts, and even number 2, 4, 6 . . . are used for the second group of signal parts.

In step S112' and S113', for the first signal part, a sequence number F1'+2 is used to replace the sequence number F1 in FIG. 11a, so as to simplify the computation formula. As shown in FIG. 11b, the number F1' will be used directly in the formula "TA=TA0*(F1'+1)/2" in S113', so as to obtain the TA value quickly.

Similarly, in steps S122' and S123', for the second signal part, a sequence number F2'+2 is used to replace the sequence number F2 in FIG. 11a, so as to simplify the computation formula. As shown in FIG. 11b, the number F2' will be used directly in the formula "TA=−TA0*F2'/2" in S113', so as to obtain the TA value quickly.

Figure 12:
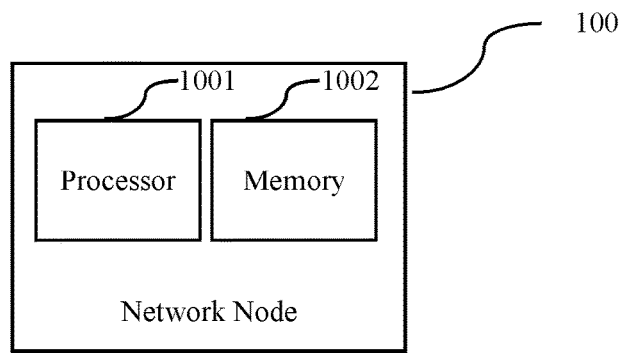
FIG. 12 is a block diagram showing the network node, according to embodiments of the present disclosure.

FIG. 12 is a block diagram showing the network node, according to embodiments of the present disclosure.

As shown in FIG. 12, the network node 100 comprises: a processor 1001; and a memory 1002, containing instructions executable by the processor 1001. The network node 100 may be operative to implement any method above mentioned. For example, the network node 100 is operative to receive (S101) a time domain signal, which contains at least part of a reference signal; extract (S102), from the time domain signal, a first group of signal parts including at least one signal part, and a second group of signal parts including at least one signal part, wherein the first group of signal parts do not overlap the second group of signal parts; and determine (S103) a timing advance, TA, value based on an energy of a signal part in the first group of signal parts and an energy of a signal part in the second group of signal parts, wherein the energy of the signal part is based on correlation between the signal part and the reference signal.

In embodiments of the present disclosure, the network node 100 above mentioned is further operative to implement any method above mentioned, such as any method shown in FIGS. 3-11.

The processor 1001 may be any kind of processing component, such as one or more microprocessor or microcontrollers, as well as other digital hardware, which may include digital signal processors (DSPs), special-purpose digital logic, and the like. The memory 1002 may be any kind of storage component, such as read-only memory (ROM), random-access memory, cache memory, flash memory devices, optical storage devices, etc.

Figure 13:
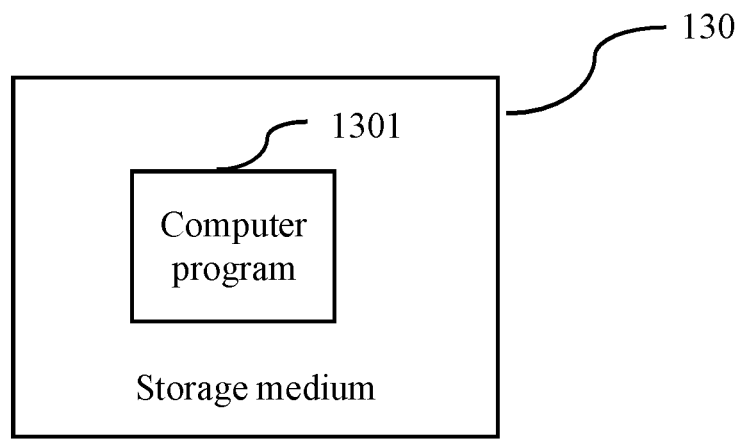
FIG. 13 is a block diagram showing a computer readable storage medium, according to embodiments of the present disclosure.

FIG. 13 is a block diagram showing a computer readable storage medium, according to embodiments of the present disclosure.

As shown in FIG. 13, the computer readable storage medium 130 has a computer program 1301 stored thereon. The computer program 1301 may be executable by a device to cause the device to carry out any method above mentioned, such as anyone in FIGS. 2-11.

The computer readable storage medium 130 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

Figure 14:
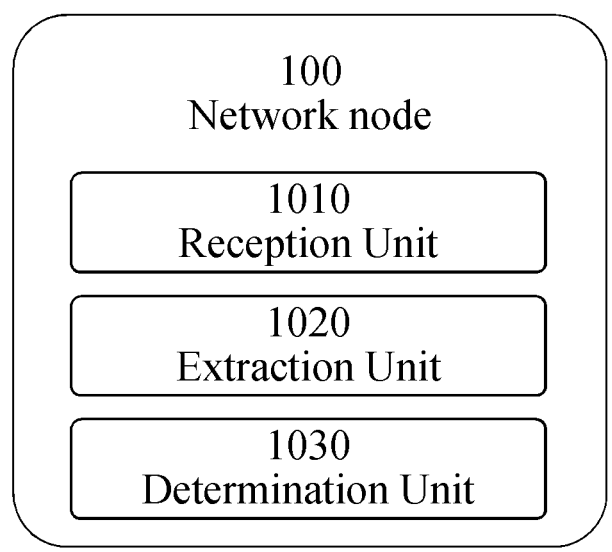
FIG. 14 is a block diagram showing function units of the network node, according to embodiments of the present disclosure.

FIG. 14 is a block diagram showing function units of the network node, according to embodiments of the present disclosure.

As shown in FIG. 14, the network node 100 comprises: a reception unit 1010, configured to receive a time domain signal, which contains at least part of a reference signal; an extraction unit 1020, configured to extract, from the time domain signal, a first group of signal parts including at least one signal part, and a second group of signal parts including at least one signal part, wherein the first group of signal parts do not overlap the second group of signal parts; a determination unit 1030, configured to determine a timing advance, TA, value based on an energy of a signal part in the first group of signal parts and an energy of a signal part in the second group of signal parts, wherein the energy of the signal part is based on correlation between the signal part and the reference signal.

In embodiments of the present disclosure, the energy of the signal part is further based on an energy accumulation in a period time.

In embodiments of the present disclosure, a length of the time domain signal is equal to a length of the reference signal.

In embodiments of the present disclosure, the determination unit 1030 may be configured to: determine the TA value based on a comparison of an energy $E(n1\_1)$ and an energy $(n2\_1)$. The first group of signal parts are extracted from a start of the time domain signal, and the second group of signal parts are extracted from an end of the time domain signal. The $n1\_1$ refers to a signal part in the first group of signal parts, and at the start of the time domain signal. The $n2\_1$ refers to a signal part in the second group of signal parts, and at the end of the time domain signal.

In embodiments of the present disclosure, the determination unit 1030 is configured to: if the comparison of the energy $E(n1\_1)$ and the energy $(n2\_1)$ meets a first condition, determine the TA value is more than 0; if the comparison of the energy $E(n1\_1)$ and the energy $(n2\_1)$ meets a second condition, determine the TA value is less than 0; if the comparison of the energy $E(n1\_1)$ and the energy $(n2\_1)$ meets a third condition, determine the TA value is about equal to 0.

In embodiments of the present disclosure, the determination unit is configured to: if the TA value is determined to be more than 0, calculate an energy $E(n1)$, for each signal part in the first group of signal parts, along a first direction from the start to the end of the time domain signal, so as to determine a first signal part; if the TA value is determined to be less than 0, calculate an energy $E(n2)$, for each signal part in the second group of signal parts, along a second direction from the end to the start of the time domain signal, so as to determine a second signal part; determine the TA value based on a period time between the start of the time domain signal and the first signal part, or a period time between the end of the time domain signal and the second signal part. The $n1$ variably refers to each signal part in the first group of signal parts. At the first signal part, the energy $E(n1)$ meets a fourth condition. The $n2$ variably refers to each signal part in the second group of signal parts. At the second signal part, the energy $E(n2)$ meets a fifth condition.

In embodiments of the present disclosure, the first condition comprises that an energy ratio of $E(n2\_1)/E(n1\_1)$ is more than the first threshold T1. The second condition comprises that the energy ratio of $E(n2\_1)/E(n1\_1)$ is less than a second threshold T2. The third condition comprises that the energy ratio of $E(n2\_1)/E(n1\_1)$ is more than the second threshold T2 and less than the first threshold T1. The first threshold T1 is more than 1, and the second threshold T2 is less than 1.

In embodiments of the present disclosure, the fourth condition comprises that, at the first signal part, along the first direction, an energy ratio of $E(n2\_1)/E(n1)$ changes from being more than the first threshold T1 to being not more than the first threshold T1. The fifth condition comprises that, at the second signal part, along the second direction, an energy ratio of $E(n2)/E(n1\_1)$ changes from being less than the second threshold T2 to being not less than the second threshold T2.

In embodiments of the present disclosure, the first condition comprises that an energy difference of $E(n2\_1)-E(n1\_1)$ is more than the third threshold T3. The second condition comprises that the energy difference of $E(n2\_1)-E(n1\_1)$ is less than a fourth threshold T4. The third condition comprises that the energy difference of $E(n2\_1)-E(n1\_1)$ is more than the fourth threshold T4 and less than the third threshold T3. The third threshold T3 is more than 0, and the fourth threshold T4 is less than 0.

In embodiments of the present disclosure, the fourth condition comprises that, at the first signal part, along the first direction, an energy difference of $E(n2\_1)-E(n1)$ changes from being more than the third threshold T3 to being not more than the third threshold T3. The fifth condition comprises that, at the second signal part, along the second direction, an energy difference of $E(n2)-E(n1\_1)$ changes from being less than the fourth threshold T4 to being not less than the fourth threshold T4.

In embodiments of the present disclosure, a signal part is configured to be at least one of: overlapping with another signal part; adjacent to another signal part with a distance; and adjacent to another signal part without a distance and without overlapping.

The term unit/function unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With these units, the network node 100 may not need a fixed processor or memory, any computing resource and storage resource may be arranged from at least one network node/device/entity/apparatus in the communication system. The virtualization technology and network computing technology may be further introduced, so as to improve the usage efficiency of the network resources and the flexibility of the network.

According to the embodiments of the present disclosure, the TA value may be obtained, based on a signal including only one reference signal. Specifically, the TA value may be obtained, based on energies of different signal part of the received signal.

Further, the exemplary overall commutation system including the terminal device and the network node will be introduced as below.

The present disclosure may provide a communication system comprising: a host computer including: processing circuitry configured to provide user data; and a communication interface configured to forward the user data to a cellular network for transmission to a terminal device; wherein the cellular network includes any network node above mentioned.

In embodiments of the present disclosure, the communication system above mentioned further comprises: the terminal device, configured to communicate with the network node.

In embodiments of the present disclosure, the processing circuitry of the host computer is configured to execute a host application, thereby providing the user data; and the terminal device includes a processing circuitry configured to execute a client application associated with the host application.

The present disclosure may provide a communication system, comprising: a host computer including: a communication interface configured to receive user data originating from a transmission from a terminal device; and any network node above mentioned. The transmission is from the terminal device to the network node.

In embodiments of the present disclosure, the processing circuitry of the host computer is configured to execute a host application; and the terminal device is configured to execute a client application associated with the host application, thereby providing the user data to be received by the host computer.

Figure 15:
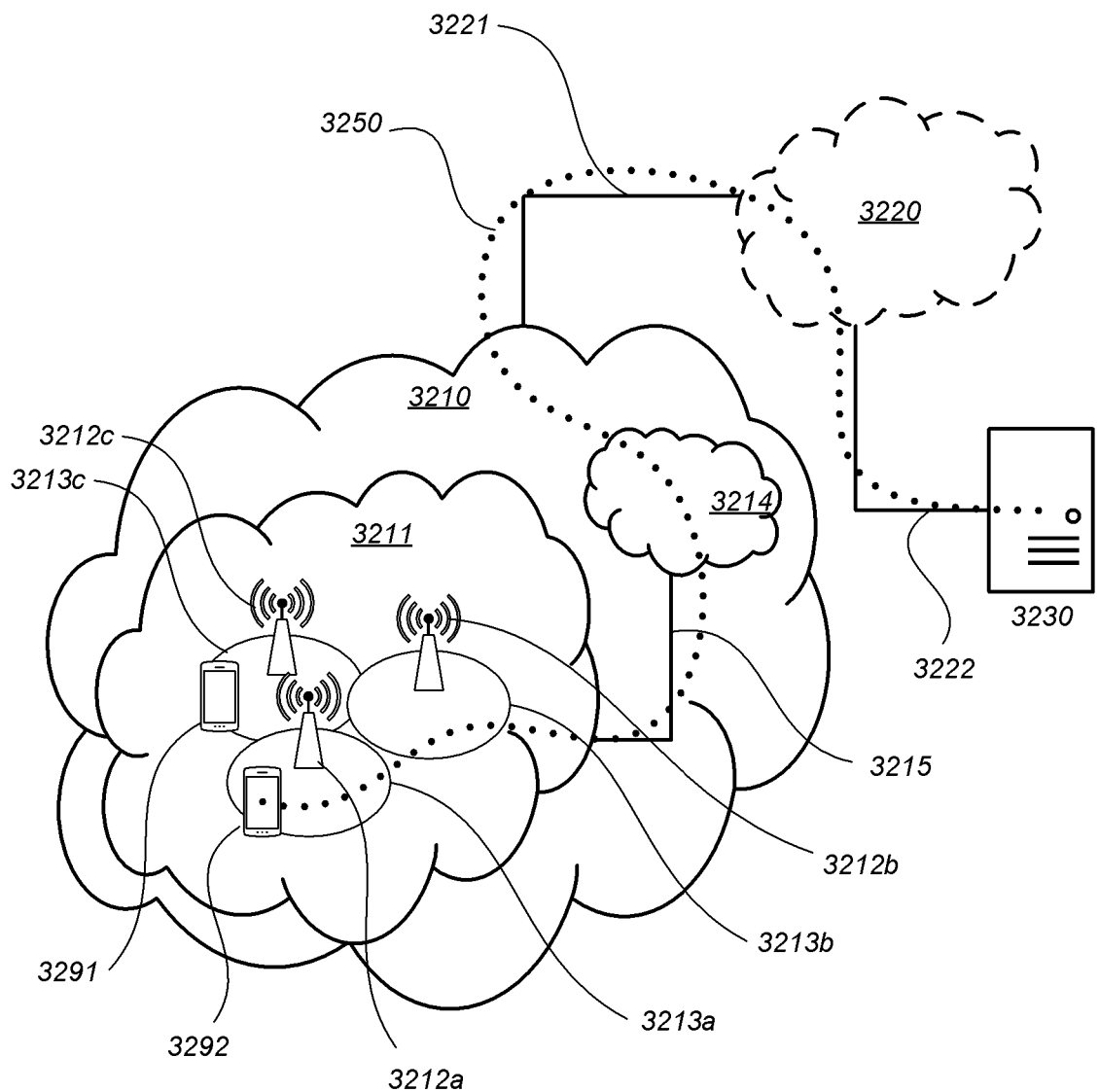
FIG. 15 schematically illustrates a telecommunication network connected via an intermediate network to a host computer.

With reference to FIG. 15, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 15 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 16. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 16) served by the base station 3320. The communication interface 3326 may be configured to facilitate a connection 3360 to the host computer 3310. The connection 3360 may be direct or it may pass through a core network (not shown in FIG. 16) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 16:
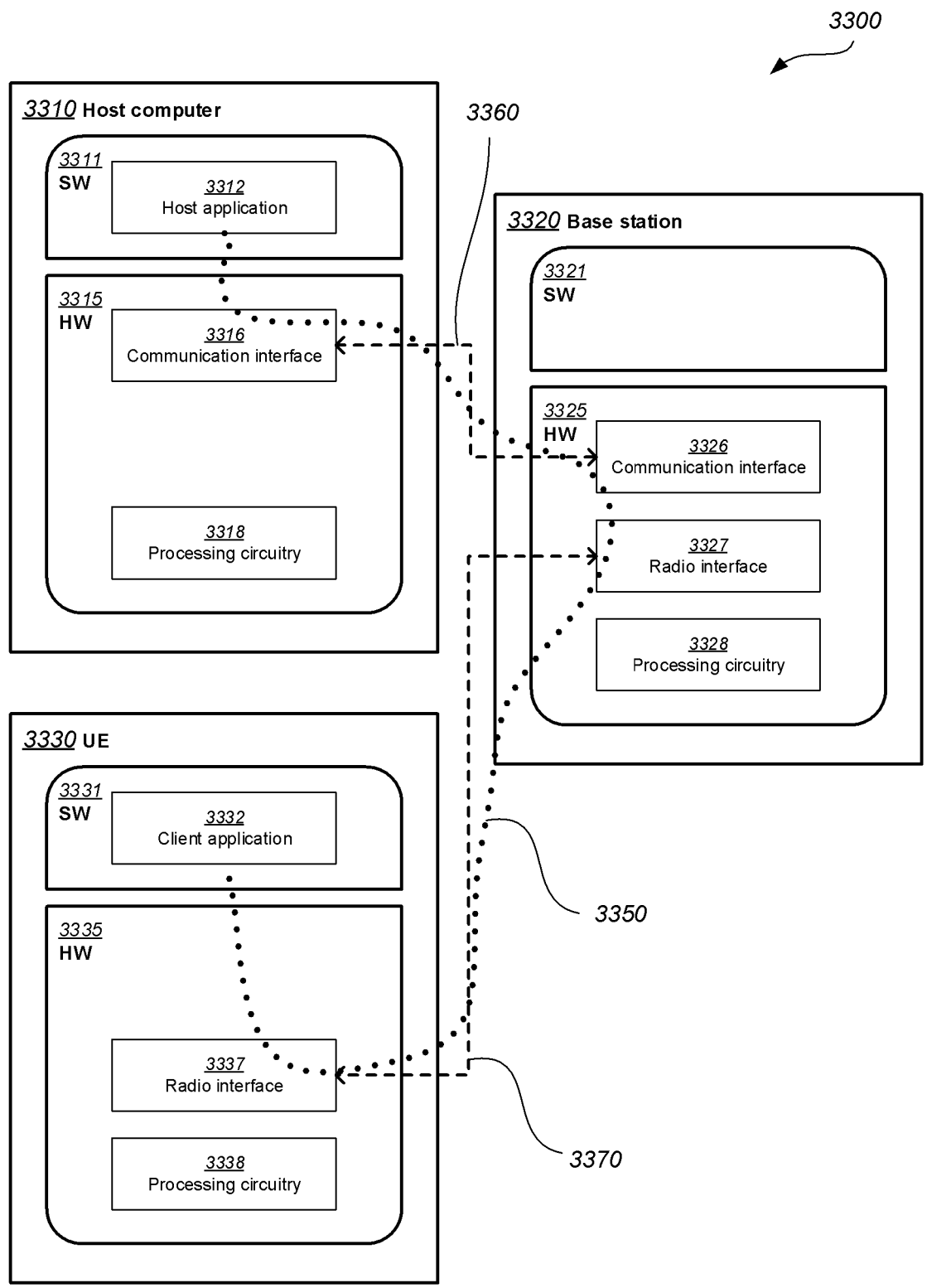
FIG. 16 is a generalized block diagram of a host computer communicating via a base station with a user equipment over a partially wireless connection.

It is noted that the host computer 3310, base station 3320 and UE 3330 illustrated in FIG. 16 may be identical to the host computer 3230, one of the base stations 3212a, 3212b, 3212c and one of the UEs 3291, 3292 of FIG. 15, respectively. This is to say, the inner workings of these entities may be as shown in FIG. 16 and independently, the surrounding network topology may be that of FIG. 15.

In FIG. 16, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption and thereby provide benefits such as reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 17, 18:
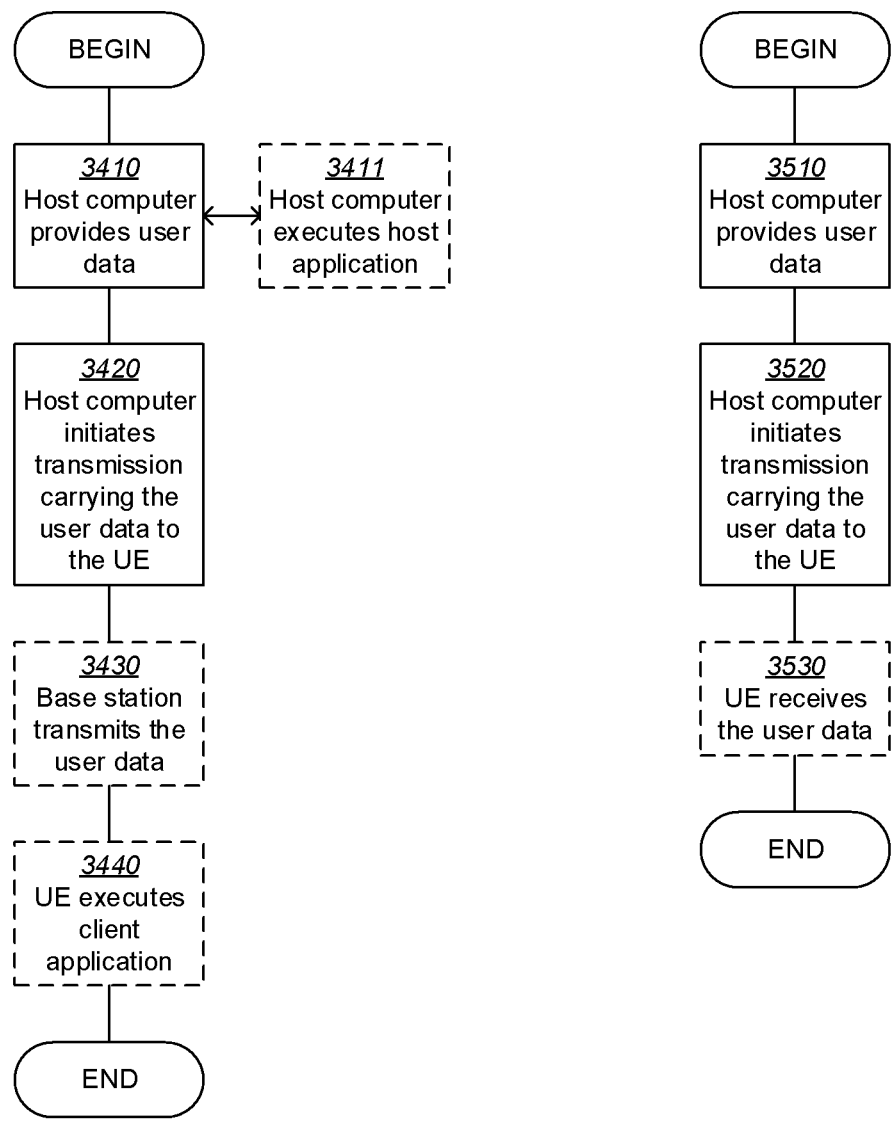
FIG. 17 is a schematic showing methods implemented in a communication system including a host computer, a base station and a user equipment in accordance with some embodiments.
FIG. 18 is a schematic showing methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figures 19, 20:
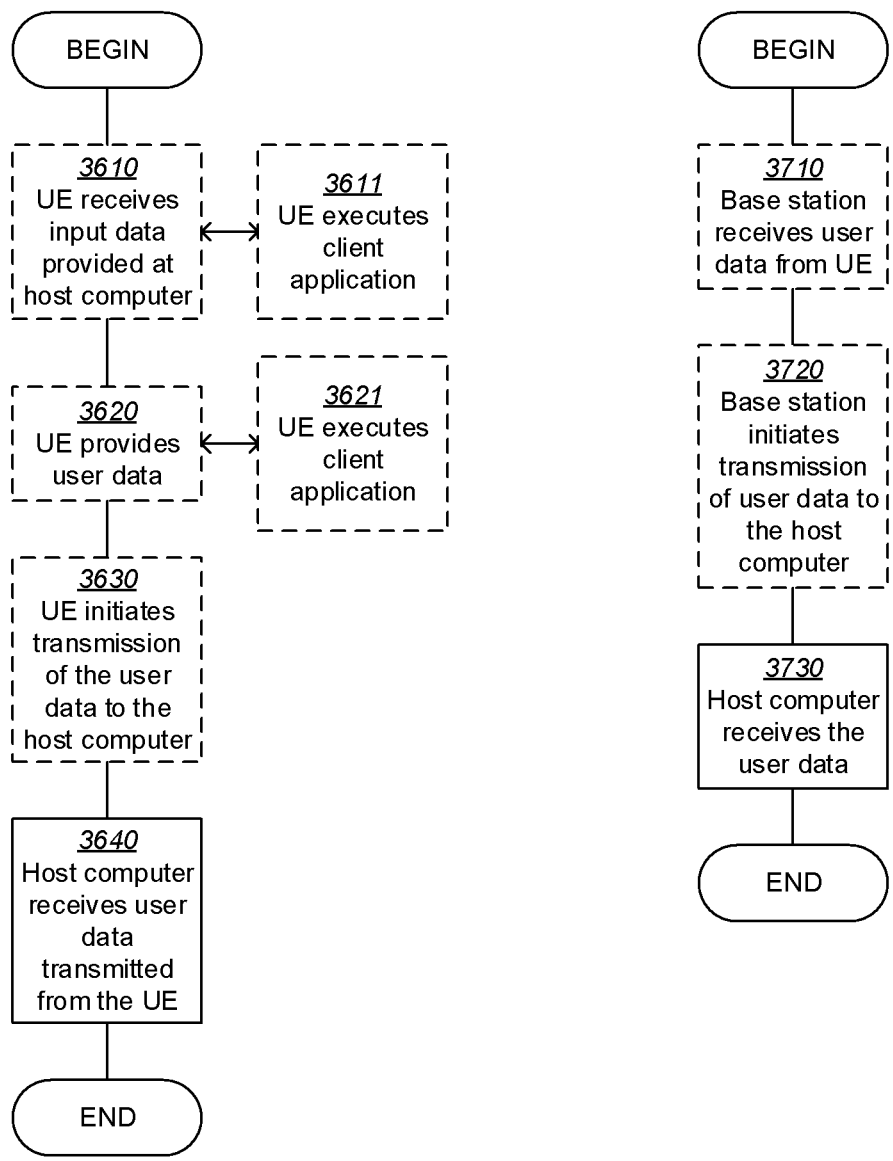
FIG. 19 is a schematic showing methods implemented in a communication system including a host computer, a base station and a user equipment in accordance with some embodiments.
FIG. 20 is a schematic showing methods implemented in a communication system including a host computer, a base station and a user equipment in accordance with some embodiments.

FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 20 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 20 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

According to the embodiments of the present disclosure, the TA value may be obtained, based on a signal including only one reference signal. Specifically, the TA value may be obtained, based on energies of different signal part of the received signal.

In general, the various exemplary embodiments of the present disclosure may be implemented in hardware or special purpose circuits, software, logic or any combination thereof. For example, some aspects may be implemented in hardware, while other aspects may be implemented in firmware or software that may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may include circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by those skilled in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

The invention claimed is:

1. A method performed at a network node, comprising:
receiving a time domain signal, which contains at least part of a reference signal;
extracting, from the time domain signal, a first group of signal parts including at least one signal part, and a second group of signal parts including at least one signal part, the first group of signal parts not overlapping the second group of signal parts; and
determining a timing advance, TA, value based on an energy of a signal part in the first group of signal parts and an energy of a signal part in the second group of signal parts, the energy of the signal part being based on correlation between the signal part and the reference signal, the determination of the TA comprising determining the TA value based on a comparison of an energy $E(n1)$ and an energy $E(n2)$, the first group of signal parts being extracted from a start of the time domain signal, and the second group of signal parts being extracted from an end of the time domain signal, the n1 referring to a signal part in the first group of signal parts, the n2 referring to a signal part in the second group of signal parts.

2. The method according to claim 1, wherein the energy of the signal part is further based on an energy accumulation in a period time.

3. The method according to claim 1, wherein a length of the time domain signal is equal to a length of the reference signal.

4. The method according to claim 1, wherein determining the TA value based on a comparison of an energy $E(n1)$ and an energy $E(n2)$ comprises:
if the comparison of an energy $E(n1\_1)$ and an energy $E(n2\_1)$ meets a first condition, determining the TA value is more than 0;
if the comparison of the energy $E(n1\_1)$ and the energy $E(n2\_1)$ meets a second condition, determining the TA value is less than 0;
if the comparison of the energy $E(n1\_1)$ and the energy $E(n2\_1)$ meets a third condition, determining the TA value is equal to 0;
wherein the n1_1 refers to a signal part in the first group of signal parts, and at the start of the time domain signal; and
wherein the n2_1 refers to a signal part in the second group of signal parts, and at the end of the time domain signal.

5. The method according to claim 4, wherein determining the TA value based on a comparison of an energy $E(n1)$ and an energy $E(n2)$ further comprises:

determining the TA value based on a period time between the start of the time domain signal and a first signal part in the first group of signal parts, if the TA value is more than 0,
wherein at the first signal part, the energy E(n1) meets a fourth condition; or
determining the TA value based on a period time between the end of the time domain signal and a second signal part in the second group of signal parts, if the TA value is less than 0, wherein at the second signal part, the energy E(n2) meets a fifth condition.

6. The method according to claim 4,
wherein the first condition comprises that an energy ratio of E(n2_1)/E(n1_1) is more than a first threshold T1;
wherein the second condition comprises that the energy ratio of E(n2_1)/E(n1_1) is less than a second threshold T2;
wherein the third condition comprises that the energy ratio of E(n2_1)/E(n1_1) is more than the second threshold T2 and less than the first threshold T1; and
wherein the first threshold T1 is more than 1, and the second threshold T2 is less than 1 and more than 0.

7. The method according to claim 4,
wherein the first condition comprises that an energy difference of E(n2_1)–E(n1_1) is more than a third threshold T3;
wherein the second condition comprises that the energy difference of E(n2_1)–E(n1_1) is less than a fourth threshold T4;
wherein the third condition comprises that the energy difference of E(n2_1)–E(n1_1) is more than the fourth threshold T4 and less than the third threshold T3;
wherein the third threshold T3 is more than 0, and the fourth threshold T4 is less than 0.

8. The method according to claim 5,
wherein the fourth condition comprises that, at the first signal part, along a first direction from the start to the end of the time domain signal, an energy ratio of E(n2)/E(n1) changes from being more than a first threshold T1 to being not more than the first threshold T1; and
wherein the fifth condition comprises that, at the second signal part, along a second direction from the end to the start of the time domain signal, an energy ratio of E(n2)/E(n1) changes from being less than a second threshold T2 to being not less than the second threshold T2;
wherein the first threshold T1 is more than 1, and the second threshold T2 is less than 1 and more than 0.

9. The method according to claim 5,
wherein the fourth condition comprises that, at the first signal part, along a first direction from the start to the end of the time domain signal, an energy difference of E(n2)–E(n1) changes from being more than a third threshold T3 to being not more than the third threshold T3; and
wherein the fifth condition comprises that, at the second signal part, along the second direction from the end to the start of the time domain signal, an energy difference of E(n2)–E(n1) changes from being less than a fourth threshold T4 to being not less than the fourth threshold T4;
wherein the third threshold T3 is more than 0, and the fourth threshold T4 is less than 0.

10. The method according to claim 1, wherein a signal part is configured to be at least one of:
overlapping with another signal part; adjacent to another signal part with a distance; and
adjacent to another signal part without a distance and without overlapping.

11. A network node, comprising:
a processor; and
a memory, containing instructions executable by the processor; the network node being operative to:
receive a time domain signal, which contains at least part of a reference signal;
extract, from the time domain signal, a first group of signal parts including at least one signal part, and a second group of signal parts including at least one signal part, wherein the first group of signal parts not overlap overlapping the second group of signal parts; and
determine a timing advance, TA, value based on an energy of a signal part in the first group of signal parts and an energy of a signal part in the second group of signal parts, the energy of the signal part being based on correlation between the signal part and the reference signal, the determination of the TA comprising determining the TA value based on a comparison of an energy E(n1) and an energy E(n2), the first group of signal parts being extracted from a start of the time domain signal, and the second group of signal parts being extracted from an end of the time domain signal, the n1 referring to a signal part in the first group of signal parts, the n2 referring to a signal part in the second group of signal parts.

12. The network node according to claim 11, wherein the energy of the signal part is further based on an energy accumulation in a period time.

13. A non-transitory computer readable storage medium having a computer program stored thereon, the computer program executable by a device to cause the device to:
receive a time domain signal, which contains at least part of a reference signal;
extract, from the time domain signal, a first group of signal parts including at least one signal part, and a second group of signal parts including at least one signal part, the first group of signal parts not overlapping the second group of signal parts; and
determine a timing advance, TA, value based on an energy of a signal part in the first group of signal parts and an energy of a signal part in the second group of signal parts, the energy of the signal part being based on correlation between the signal part and the reference signal, the determination of the TA comprising determining the TA value based on a comparison of an energy E(n1) and an energy E(n2), the first group of signal parts being extracted from a start of the time domain signal, and the second group of signal parts being extracted from an end of the time domain signal, the n1 referring to a signal part in the first group of signal parts, the n2 referring to a signal part in the second group of signal parts.

* * * * *